United States Patent [19]

Turunen et al.

[11] Patent Number: 4,639,515

[45] Date of Patent: Jan. 27, 1987

[54] CYCLIC PROCESS FOR PRODUCING AN ALKALI SOLUTION OF CELLULOSE CARBAMATE AND PRECIPITATING THE CARBAMATE

[75] Inventors: Olli T. Turunen; Jouko Huttunen, both of Porvoo; Johan-Fredrik Selin, Helsinki; Jan Fors; Vidar Eklund, both of Porvoo, all of Finland

[73] Assignee: Neste Oy, Finland

[21] Appl. No.: 779,798

[22] Filed: Sep. 24, 1985

[30] Foreign Application Priority Data

Sep. 27, 1984 [FI] Finland .................................. 843814

[51] Int. Cl.$^4$ ............................. C08B 3/00; D01F 2/00
[52] U.S. Cl. ........................................ 536/30; 264/187
[58] Field of Search ........................... 536/30; 264/187

[56] References Cited

U.S. PATENT DOCUMENTS

| | | | |
|---|---|---|---|
| 2,103,639 | 12/1937 | Richter | 264/187 |
| 2,231,927 | 2/1941 | Lilienfeld | 264/187 |
| 2,265,916 | 12/1941 | Lilienfeld | 264/187 |
| 2,283,809 | 5/1942 | Izard | 264/187 |
| 2,371,359 | 3/1945 | Shutt | 264/187 |
| 4,404,369 | 9/1983 | Huttunen et al. | 536/30 |
| 4,456,749 | 6/1984 | Mandell et al. | 536/30 |
| 4,567,255 | 1/1986 | Eklund et al. | 536/30 |

Primary Examiner—Ronald W. Griffin
Attorney, Agent, or Firm—Steinberg & Raskin

[57] ABSTRACT

The present invention concerns a cyclic process for producing an alkali aqueous solution of cellulose carbamate, for precipitating the cellulose carbamate from the alkali solution and for recovering and recycling the remaining chemicals. The process comprises the following steps: (a) an alkali solution of cellulose carbamate is prepared by dissolving cellulose carbamate in an aqueous solution of sodium hydroxide, (b) the solution obtained in step (a) is contacted with a precipitation aqueous solution containing sodium carbonate, whereby the cellulose carbamate is precipitated and can be removed, (c) from the solution in step (b) sodium carbonate is crystallized and is returned to the precipitant solution in step (b), and (d) mother liquor containing sodium hydroxide, obtained, i.e. remaining from, step (c), is returned to step (a) for dissolving cellulose carbamate. The crystallizing in step (c) is accomplished in two or several steps by cooling.

16 Claims, 1 Drawing Figure

U.S. Patent  Jan. 27, 1987  4,639,515
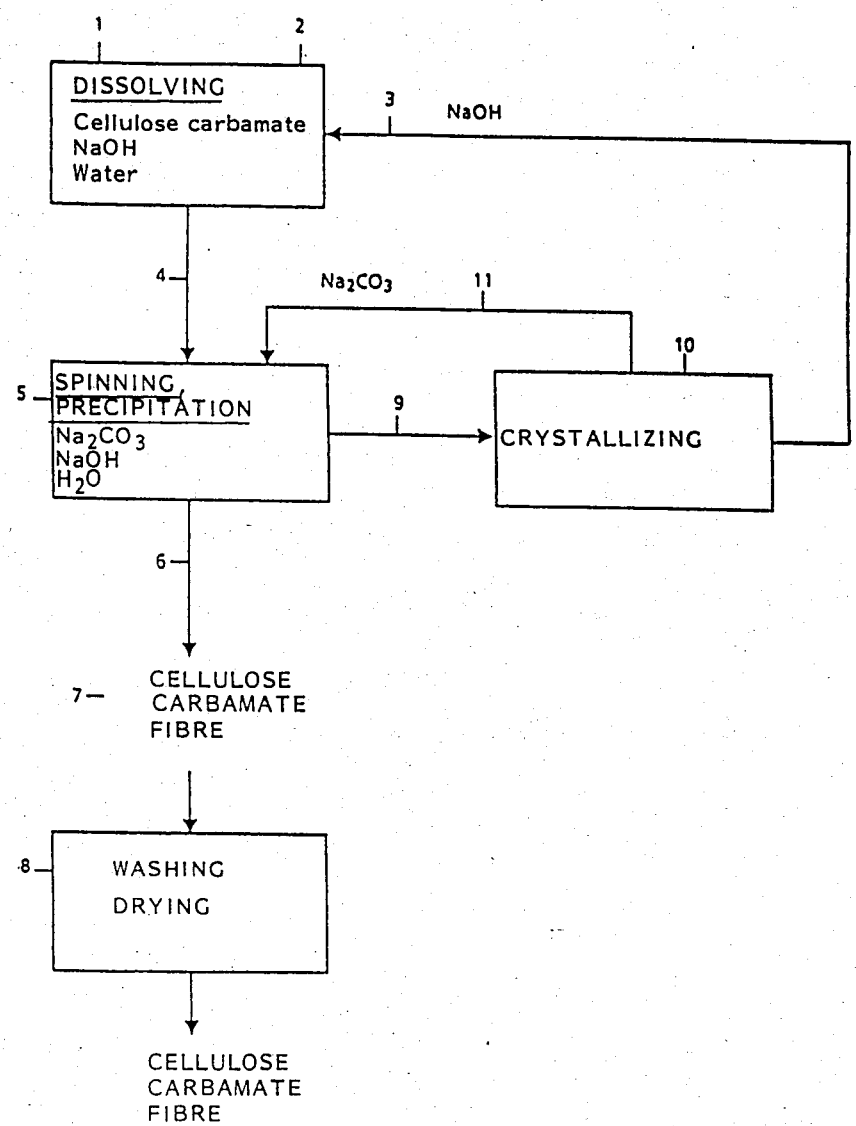

CYCLIC PROCESS FOR PRODUCING AN ALKALI SOLUTION OF CELLULOSE CARBAMATE AND PRECIPITATING THE CARBAMATE

BACKGROUND OF THE INVENTION

The present invention concerns a cyclic process for producing an alkali solution of cellulose carbamate, for precipitating the cellulose carbamate from the alkali solution and then for recovering the remaining chemical for re-use in a recycling system.

Cellulose carbamate is an alkali-soluble cellulose derivative which is a reaction product of cellulose and isocyanic acid. It is possible to produce an alkali solution of cellulose carbamate which can be formed into fiber and film by using a precipitation bath which precipitates the cellulose carbamate from the solution.

For the precipitation bath a solution containing sulphuric acid has usually been used. Cellulose carbamate is stable in acid conditions and it is therefore not decomposed when thus precipitated. When an alkali solution, e.g., a sodium hydroxide solution, of cellulose carbamate is contacted with sulphuric acid, the cellulose carbamate is precipitated and at the same time, as the sodium hydroxide is neutralized, sodium sulphate is formed. In a continuous process both sulphuric acid and sodium hydroxide are consumed while, at the same time, more sodium sulphate is produced. Thus, the spinning process, if such is used, produces sodium sulphate, which must be removed from the process and sold as a by-product.

Another, more significant, drawback is that the sodium hydroxide neutralized by suphuric acid cannot easily be returned to the process. The sodium hydroxide accounts for a significant part of the raw material costs of the process. It would therefore be desirable to develop a precipitation method in which no undesired by-products are produced, a method which does not require use of a mineral acid and in which at least a substantial part of the sodium hydroxide can be recovered in an economical way.

At the same time, the method should meet certain requirements as regards the fiber or film quality. For instance, the initial strength of the fiber or film being precipitated should be sufficient to withstand mechanical strains to which it is subjected in the treatment. In fiber manufacturing, for instance, stretching the fiber is essential in the spinning step for achieving the desired strength properties.

SUMMARY OF THE INVENTION

The object of the present invention is a cyclic process for dissolving cellulose carbamate from an alkali solution and for recovering the remaining chemicals for re-use in a recycling system. The method of the invention is characterized by the following steps:

(a) an alkali aqueous solution of cellulose carbamate is prepared by dissolving cellulose carbamate in an aqueous sodium hydroxide solution;

(b) the solution obtained in step (a) is contacted with an aqueous precipitant solution containing sodium carbonate, whereby the cellulose carbamate is precipitated and can be separated from the solution;

(c) from the solution obtained in step (b) sodium carbonate is crystallized and this is returned to the precipitant solution of step (b); and (d) mother liquor containing sodium hydroxide, obtained in, i.e. remaining from, step (c), is returned to step (a) for dissolving cellulose carbamate.

With the aid of the present invention a fully cyclic process is achieved, which combines in a single method the production of cellulose carbamate solution using sodium hydroxide recovered in the process, the precitation of the cellulose carbamate solution in an aqueous precipitant solution containing no mineral acid, the regeneration and re-use of the precipitant solution, and economic recovery of the sodium hydroxide and its return to the dissolving step. In the cyclic process of the invention, there is in principle no need to add or remove chemicals, and this is altogether novel, compared with the tehniques of the prior art.

BRIEF DESCRIPTION OF THE DRAWING

The single Figure in the drawing is a flow or process chart illustrating the steps of the method of the present invention.

DETAILED DESCRIPTION OF THE PREFERRED EMBODIMENTS

The first step in the cyclic process of the invention is the production of an alkali solution of cellulose carbamate. For spinning carbamate fibers, a spinning solution is prepared by dissolving cellulose carbamate in an aqueous solution of sodium hydroxide. The spinning solution typically contains from about 4% to about 15% by weight of cellulose carbamate dissolved in from about 5% to about 12% by weight of sodium hydroxide. For the dissolution step a sodium hydroxide solution is advantageously used which has been recovered in a manner to be described below while regenerating the precipitation bath.

The sodium hydroxide solution of cellulose carbamate produced in the spinning step in the manner described above is spun in the conventional way through spinnerettes into a precipitating bath, whereby the carbamate is precipitated as a fiber-like product. For the precipitating solution, a sodium carbonate solution, preferably an aqueous solution thereof, is used in the method of the invention. The concentration of the sodium carbonate in the precipitating bath is from about 10% to about 30% by weight, preferably over about 20% by weight, most advantageously about 25% by weight.

It is essential that in the process of the invention the precipitation solution is substantially free of sulphuric acid or other mineral acid, in contrast to the processes of the prior art.

The spun fiber is separated from the precipitant solution and washed and dried in a manner known in itself in the art.

Together with the solution being spun, sodium hydroxide also is fed into the precipitant solution. In a continuous process it is necessary to remove an equivalent quantity of sodium hydroxide in order to maintain the concentration thereof at a substantially constant level. Normally, the precipitant solution may contain maximally about 56% by weight sodium hydroxide without substantially impeding the precipitation properties. Similarly, it is necessary to take care that the sodium carbonate content of the precipitant is maintained within the desired limits.

The regeneration of the precipitant solution in the cyclic process of the invention comprises a number of reaction steps which in themselves are not new, but which have not before been utilized in manufacturing cellulose derivative fibers. As taught by the invention, it has been observed that from the precipitant solution the sodium carbonate is separated by crystallizing. The residual mother liquor contains mainly aqueous sodium hydroxide solution and can be used as it is to dissolve additional cellulose carbamate.

Crystallizing the sodium carbonate from the precipitant solution is best accomplished by cooling the solution. The crystallization can be carried out in one or several steps using gradually decreasing crystallizing temperatures. The latter procedure is preferred because then the recovery of the mother liquor is easier. In single-step crystallization, one has to handle a very thick crystal sludge and this may introduce difficulties in handling.

If multiple=step crystallization is employed, cooling to about 10°-20° C. is sufficient in the first step. The separate crystals are further cooled for additional crystallization. The suitable ultimate cooling temperature is about $-5°$ C. because at this temperature the solubility of sodium carbonate is only about 1.6% and the mother liquor of NaOH solution may be used as it is for dissolving cellulose carbamate. Moreover, a solution at this temperature is most appropriate for the dissolving of the carbamate.

Of course, all conventional aids may be applied in the crystallization process such as adding nuclei, removal and recycling. It is likewise possible in the crystallization process to apply, as required, continuous-action or batch-type crystallizers.

The invention is described in the following with the aid of the process chart reproduced in the attached Figure. Cellulose carbamate, indicated by reference numeral 1 in the figure, is fed to a dissolving step carried out in a vessel 2. The cellulose carbamate is dissolved in an aqueous sodium hydroxide solution, which is conducted to the dissolving step through a conduit 3. The concentration of the sodium carbamate solution produced in vessel 2 may be varied, depending on the desired spinning conditions, by varying the quantity of sodium hydroxide conducted to the dissolving step by addition of water or by evaporating water. As a rule, the concentration of the carbamate solution is in the range from about 4% to about 15% cellulose carbamate by weight and the sodium hydroxide content is in the range from about 5% to about 12% by weight, typically from about 5% to about 12% by weight. In the dissolving step, agents promoting solubility may be used, if required, but their use is not a feature of the present invention.

The alkali solution of cellulose carbamate obtained in vessel 2 is conducted through a conduit 4 to a spinning and precipitating step 5, in which the solution is injected, in a manner known in itself in the art, through spinnerettes (not depicted) into a precipitating solution, which causes the cellulose carbamate to precipitate from the solution in fiber form. Alternatively, slit nozzles may be used when manufacturing films. The precipitation fluid in step 5 is an aqueous solution of sodium carbonate. The solution in the spinning and precipitating step 5 also contains sodium hydroxide entering tgether with the solution being spun. The quantity of sodium hydroxide must not increase to such a level that it would impede the precipitation of cellulose carbamate. It has been found in practice that a maximum of from about 5% to about 6% by weight of sodium hydroxide can be allowed in the spinning step 5, but preferably the quantity is maintained at a lower level, not more than about 3% by weight.

The cellulose carbamate fibers produced in the spinning bath 5 can be separated, pretreated, washed and dried in ways known in themselves in the art. These steps, indicated with reference numerals 6-8, are conventional and not essential to the invention, and their more detailed description is therefore omitted.

From the spinning and precipitating step 5, solution is withdrawn through a conduit 9, this solution containing, in addition to aqueous solution of sodium carbonate, also sodium hydroxide, as has been described above.

In step 10, separation of the sodium hydroxide present in the solution is accomplished by crystallizing the sodium carbonate out of the solution. Crystallization is accomplished by the aid of cooling members (not depicted). The crystallized sodium carbonate is removed from the solution and washed with water, if required. Thereafter, the crystals can be conducted through a conduit 11 back to the precipitating step 5. The mother liquor containing sodium hydroxide is conducted through the conduit 3 back to the cellulose carbamate dissolving tank 2.

It is obvious that various modifications can be accomplished in the method of the invention without departing from the scope of the invention. For instance, the sodium carbonate crystallizing step 10 may be subdivided into several separate steps, in which different temperatures and different crystallizing aids may be applied which in themselves are not part of the present invention.

In the example following below, the cyclic process of the invention is illustrated in more detail. This example is not intended, however, to restrict or limit the scope of the invention in any way.

EXAMPLE

An aqueous solution was prepared containing 6.9% by weight cellulose carbamate having a nitrogen content of 2.1% and DP about 300, 9% by weight sodium hydroxide. The solution was spun at 25° C. in an aqueous precipitation bath containing 25% by weight sodium carbonate and 3% by weight sodium hydroxide. By the spinning process, carbamate fibers were separated from the precipitant solution, washed and dried in conventional manner.

From the precipitant solution were taken 100 parts by weight of the solution and cooled to 21.5° C. with agitation for 5 hrs. In order to facilitate the crystallization, to the solution were added 0.02 parts by weight of $Na_2CO_3 \cdot 10H_2O$ crystal nuclei. The crystal sludge obtained was separated by vacuum filtration, and the mother liquor (51.6 parts by weight) was analyzed. It contained 5.3% NaOH and 13.3% $Na_2CO_3$.

The mother liquor was cooled to $-5°$ C. and agitated for 5 hrs. The crystals that were formed were separated by filtering. The mother liquor contained 1.5% $NA_2CO_3$ and 9.7% NaOH, in which composition it is appropriate for use in dissolving cellulose carbamate.

It will thus be seen that there are provided compositions and methods which achieve the various objects of the invention and which are well adapted to meet the conditions of practical use.

As various possible embodiments might be made of the above invention, and as various changes might be made in the embodiments above set forth, it is to be understood that all matter herein described is to be interpreted as illustrative and not in a limiting sense.

What is claimed as new and desired to be protected by Letters Patent is set forth in the appended claims.

1. A cyclic method of producing an alkali solution of cellulose carbamate, precipitating the cellulose carbamate in the form of fiber or film from the alkali solution, and recovering and converting the chemicals remaining after precipitation of the cellulose carbonate for re-use in the method, comprising the steps of:
  (a) dissolving cellulose carbamate in an aqueous solution of sodium hydroxide, thereby producing an alkali solution of cellulose carbamate;
  (b) extruding said alkali solution into contact with an aqueous precipitating solution containing sodium carbonate, whereby the cellulose carbamate precipitates and can be separated from the resultant solution;
  (c) withdrawing the resultant solution of step (b) and separating said solution into aqueous sodium hydroxide and sodium carbonate components;
  (d) recycling the aqueous sodium hydroxide obtained in step (c) to dissolve cellulose carbamate according to step (a);
  (e) recycling the sodium carbonate obtained in step (c) to regenerate the precipitating solution utilized in step (b).

2. A method according to claim 1, wherein said precipitating solution is substantially free of mineral acid.

3. A method according to claim 1, wherein said precipitating solution contains from about 10 to about 30% by weight of sodium carbonate.

4. A method according to claim 3, wherein said precipitating solution contains from about 20 to about 25% by weight of sodium carbonate.

5. A method according to claim 1, wherein said precipitating solution contains a maximum of about 6% by weight of sodium hydroxide.

6. A method according to claim 5, wherein said precipitating solution contains a maximum of about 3% by weight of sodium hydroxide.

7. A method according to claim 1, wherein said alkali solution contains from about 4 to about 12% by weight of cellulose carbamate.

8. A method according to claim 7, wherein said alkali solution contains from about 5 to about 12% by weight of sodium hydroxide.

9. A method according to claim 8 wherein said alkali solution contains about 10% by weight of sodium hydroxide.

10. A method according to claim 1, wherein said alkali solution is extruded through spinnerettes into the precipitating solution, thereby causing the precipitation of cellulose carbamate in fiber form.

11. A method according to claim 1, wherein said alkali solution is extruded through slit means into the precipitating solution, thereby causing the precipitation of cellulose carbamate in film form.

12. A method according to claim 1, wherein the separation of sodium carbonate from the aqueous sodium hydroxide present in the solution obtained in step (b) is accomplished by crystallization of the sodium carbonate out of the solution.

13. A method according to claim 12 wherein said crystallization is accomplished by cooling the solution with the aid of cooling means.

14. A method according to claim 13 wherein said crystallization is accomplished by cooling the solution in at least two stages, during the first of which the solution is cooled to a selected temperature and crystallization is permitted to occur, and during each succeeding stage the solution is cooled to temperatures successively lower than said selected temperature, with additional crystallization occurring at each stage.

15. A method according to claim 13 wherein said solution is cooled to a final crystallization temperature of −5° C.

16. A method according to claim 12 wherein the sodium carbonate is separated after crystallization from the aqueous sodium hydroxide by vacuum filtration.

* * * * *